Nov. 20, 1951    J. A. HIPPLE, JR., ET AL    2,575,711
MASS SPECTROMETER RECORDER
Filed Oct. 31, 1947    2 SHEETS—SHEET 1

Nov. 20, 1951  J. A. HIPPLE, JR., ET AL  2,575,711
MASS SPECTROMETER RECORDER
Filed Oct. 31, 1947  2 SHEETS—SHEET 2

WITNESSES:
Edward Michaels
[signature]

INVENTORS
John A. Hipple, Jr. &
Donald J. Grove.
BY [signature]
ATTORNEY

Patented Nov. 20, 1951

2,575,711

UNITED STATES PATENT OFFICE 2,575,711

MASS SPECTROMETER RECORDER

John A. Hipple, Jr., Washington, D. C., and Donald J. Grove, Pittsburgh, Pa., assignors to Westinghouse Electric Corporation, East Pittsburgh, Pa., a corporation of Pennsylvania Application October 31, 1947, Serial No. 783,264

9 Claims. (Cl. 346—33)

The present invention relates to a method of controlling a recording device and, more specifically, relates to a recorder and its controls to be used in conjunction with a mass spectrometer for analyzing the constituents of a gas in accordance with the ratio of their mass-to-charge characteristics. Although the following description is concerned specifically with measuring the ion currents corresponding to various charged fragments of bombarded gases in a mass spectrometer, it obviously will be applicable to the accurate measurements of electrical charges for other purposes.

A mass spectrometer of the general character with which the present invention may be used is shown schematically in Patent 2,331,190, issued October 5, 1943 to J. A. Hipple, Jr., in which the gas to be investigated is ionized, and the constituents are successively focused through an exit slit 28 upon a collector plate 66 in accordance with their mass-to-charge values.

It is an object of the present invention to provide a recording system for a measuring device such as a mass spectrometer which is unusually accurate and insures that the record produced by the recorder is within the confines of the record chart, without sacrificing accuracy of the record.

It is a further object of the invention to provide a control system for a recorder in which the magnitude of a signal to be measured is first traced on the record chart on a non-linear scale and immediately retraced on a linear scale determined by the magnitude of the peak of the record on the non-linear scale to insure that the linear record will be within the width of the chart.

Other objects of the invention will be apparent from the following description and the accompanying drawings, in which:

Fig. 4 is a diagram of a portion of the shunt selector shown in Fig. 1 enlarged;

Fig. 5 is a view in section taken along line V—V of Fig. 4; and

Fig. 6 is a section taken along line VI—VI of Fig. 4.

Figure 1:
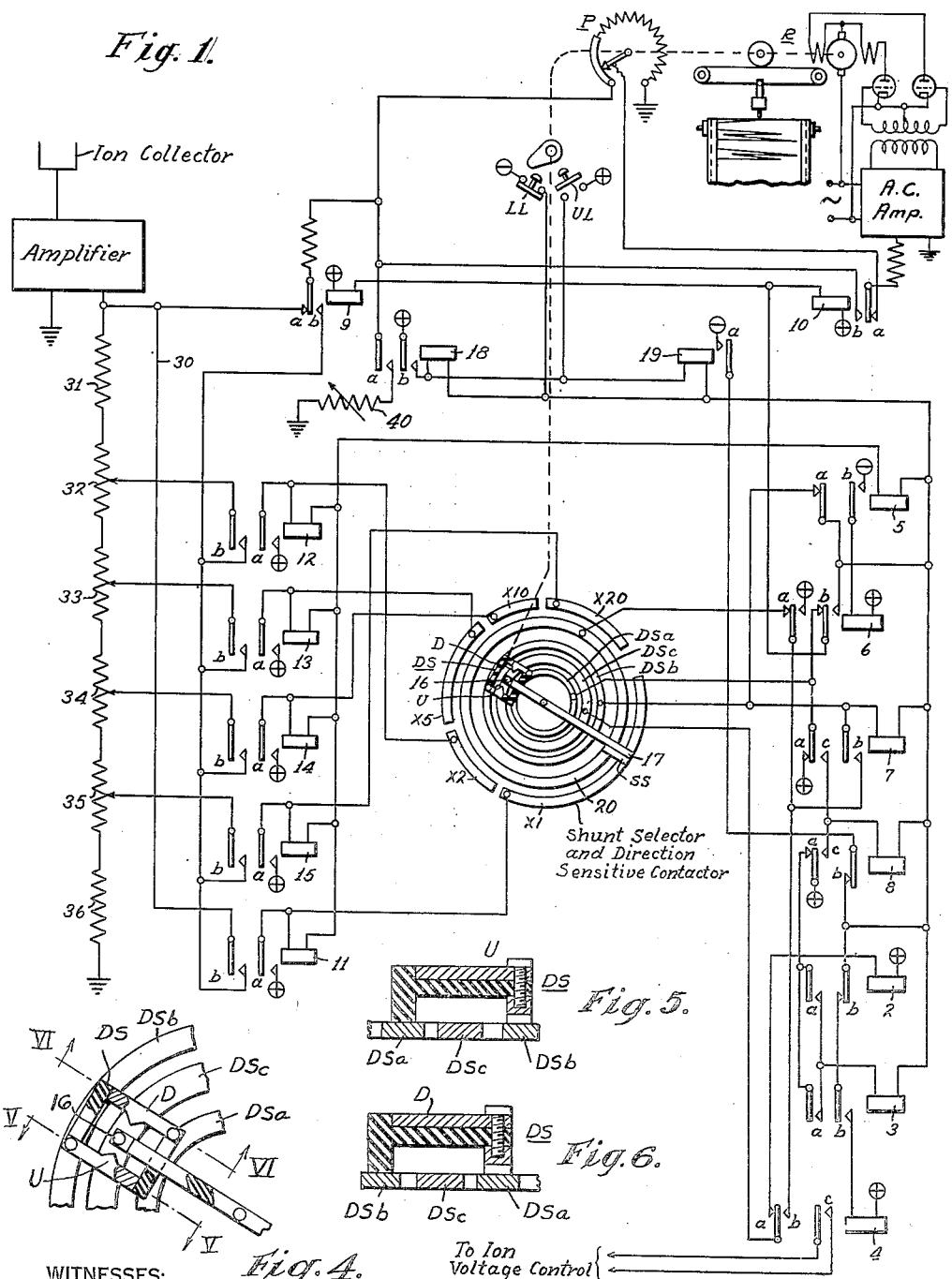
Fig. 1 is a schematic showing of a control circuit and its associated apparatus for accomplishing the purposes of the invention.

Referring more particularly to Fig. 1 on the drawings, the charge from a mass spectrometer, of the general type disclosed in the aforesaid Patent 2,331,190, for example, is collected on an ion collector cup or plate in a usual manner.

The charge on the ion collector cup is fed through a suitable amplifier, which may include an electrometer stage and a high-gain amplifier, with the amplified signal passing through contact $a$ of a relay 9, and a series resistor to an attenuating potentiometer P, normally closed contact $a$ of a relay 10, a second series resistor, to the input of the recorder R. Operation of the recorder pen motor operates, synchronously with the pen movement, the arm of potentiometer P, a limit switch with its normally open lower-limit contactor LL and upper-limit contactor UL, and a combined shunt selector and direction sensitive contactor.

The potentiometer P comprises a semi-circular segment of approximately 25° of negligible electrical resistance and a resistance winding for the remainder of the path of travel of the contact arm. As the rotating potentiometer arm passes over the 25° segment, little or no resistance is interposed to current passing to the recorder input, but as it passes over the resistance winding, increasing resistance to such signal current is interposed in accordance with the magnitude of the current. That is, the response of the recorder is non-linear, or substantially logarithmic, with respect to the current being measured beyond the 25° strip of P, and the increasing value of resistance thereafter is so chosen that, with the largest current values apt to be encountered, the record of the recorder will be within width of its chart.

The recorder R may be any of the types now being used and sold for precision recording, but preferably is of the balancing potentiometer type including a measuring element and a motor-driven pen which moves across a chart in proportion to the response of the measuring element, the pen returning to its zero position quickly thereafter.

The combined shunt selector and direction sensitive contactor is shown schematically. A movable contact carriage DS driven from the pen drive shaft is provided with contacts U and D which alternately engage contact 16, carried by a movable arm 17 of insulating material, depending upon the direction of pen movement. Contacts D and U ride respectively on circular contact strips DSa and DSb, and the contact 16 rides on a circular contact strip DSc.

When the pen drive shaft is moving the recorder-pen "up" chart, for example, contact U of DS engages the contact 16 and moves the arm 17 in a clockwise direction with its contact SS bridging a circular contact strip 20 and a plurality of successively arranged segmental strips X1 to X20. When the recorder pen starts "down" scale, the carriage DS reverses its movement breaking contact U–16, passes through a zero or no-contact position, and makes contact D–16.

The control circuit for the recorder includes a number of relays, shunts and switches to insure that a desired sequence of operations may result to obtain a desired sequence of response of the recorder R. A description of a cycle of operation of the system as a whole will give a better understanding of the results obtained.

Figures 2, 3:
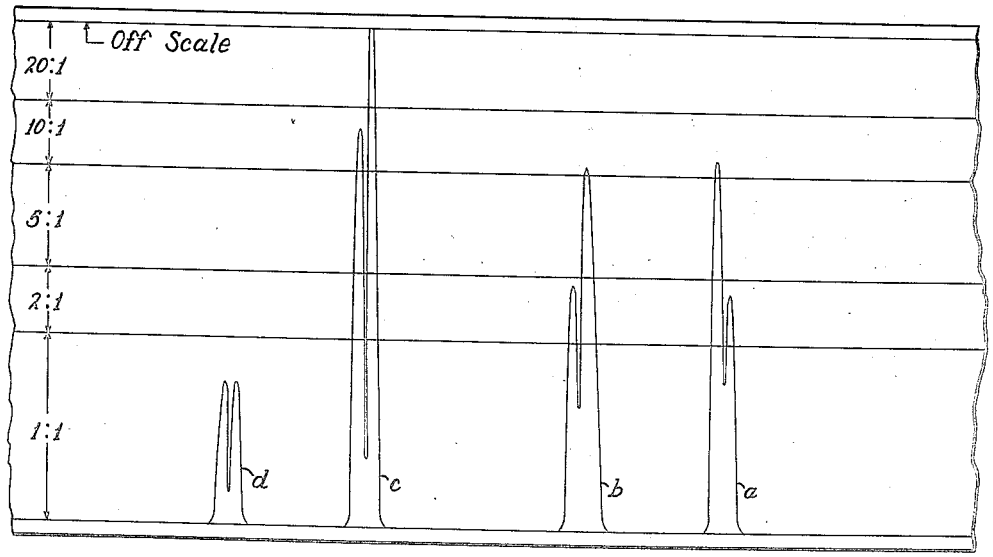
Fig. 2 is a relay operation sequence chart setting forth the operations of the various relays shown in Fig. 1.
Fig. 3 is a representation of various types of records made by the recording system under consideration.

Fig. 3 shows a typical record made in analyzing the constituents of a gas being studied in a mass spectrometer in which the charged fragments, due to bombarding the gas, having different mass-to-charge ratios are sorted by varying the ionizing voltage of the spectrometer and collecting the charges of those having the same mass-charge ratio on an ion collector cup or plate. A problem encountered is in properly recording, on one chart of practicable width, the various components of a given gas being investigated.

As indicated in Fig. 3, reading from right-to-left, a record is first traced of a peak measured on a non-linear scale (approximately logarithmic) and the height of this peak determines the appropriate shunt to be used to retrace the peak on a linear scale but within the width of the chart. According to the invention the shunt selection and retracting of the peak are accomplished automatically.

Referring to the relay sequence chart, Fig. 2, as the recorder starts in response to a signal to be measured (Operation A), the direction sensitive carriage DS is in the position indicated, with contact 16 centered between contacts D and U of DS. As shown in Fig. 1, upon movement of the pen shaft, DS moves to effect engagement of the contacts 16–U, the shunt selector arm and its bridging contact SS move along its contact strips, lower limit switch LL closes, and the arm of potentiometer P moves over the low-resistance segment thereof.

In operation B, the limit switch LL being closed, and DS contacts 16–U being closed, a circuit is completed to energize control relay 2 as follows (referring to Fig. 1):

⊕—coil of relay 2—normally closed contacts 4a—contact strip DSc—contacts 16–U of DS—strip DSb—closed contact 5a—limit switch LL—⊖.

Energizing relay 2 closes its contacts 2a which completes a circuit for relay 3:

⊕—contacts 8a—contacts 2a—relay 3—limit switch LL—⊖.

Energizing relay 3 establishes a self-holding circuit through contacts 3a and contact 8a, and closes contact 3b for preparing relay 4 for energization when 2b opens upon deenergizing of relay 2, as described below.

As the recorder pen reaches the "peak" of the record (Operation C) and just starts to go back toward zero, contacts U and D are both out of engagement with 16 of DS, thereby deenergizing relay 2, the contacts b of which then close to energize relay 4, through closed contacts 3b. The contacts c of relay 4 then close to shunt a small section of the control resistor for the ion voltage source. Such resistor is not shown in Fig. 1 but its use is well known, and may for example be a resistor similar to 46 shown in J. A. Hipple Patent 2,331,190 dated October 5, 1943.

Concurrently with the above described operations, the shunt selector arm 17 has been advancing over the contact segments X1 to X20 and as such segments are successively connected to contact ring 20, by the bridging contact SS, the chain of relays 11 to 15 are successively prepared for energization. That is, depending upon the extent of movement of the bridging contact SS, such contact will be in engagement with one of the segments X1 to X20, and the segment which is connected to the common contact ring 20, during Operation C, determines which of the relays 11 to 15 will be energized when DS reverses (Operation D) and closes its contacts D–16.

Operation D (closing of contacts D–16) includes the energization of relay 5, and one of the relays 11 to 15 depending on the position of contact SS, completing a circuit:

⊕—contact 7a—contact ring DSa—contacts D–16 of DS—contact ring DSc—contacts 4b and 6a—contact ring 20—any one of segments x1 to x20—a relay 11 to 15 corresponding to the segment selected—relay 5—to ⊖ LL.

The selected relay 11 to 15 completes a holding circuit for itself, and relay 5, through its respective contacts 11a to 15a.

Upon energization of relay 5 its contacts 5b close to energize relay 6, closing 6b to energize relays 9 and 10, and opening 6a to break the circuit to shunt selector contact ring 20 to prevent additional selective energization of any of relays 11 to 15.

Energization of relays 9 and 10 opens their contacts 9a and 10a breaking the amplifier output circuit to potentiometer P, and closes their contacts 9b and 10b.

With relay 11 energized through its selector segment X1, contact 11b are closed and held in, the amplified signal flows through contacts 11b, 9b and 10b direct to the input of recorder R and to ground.

If the maximum advance of the shunt selector contact SS engages segment x2, relay 12 is energized to close its contacts 12b to complete the signal circuit through the upper shunt portion 32 and contacts 9b to the recorder input. Accordingly the signal current is decreased to decrease the response of the measuring element. The value of shunt 32 is so chosen that its effect on the measuring element will insure a linear peak record within the width of the chart corresponding to the maximum of the non-linear peak of the same quantity.

Similarly, if relays 13, 14 or 15 are operated their contacts b close to add different values of shunt resistance (33, 34, 35). Therefore depending upon the position of the shunt selector contact SS as determined by the measured non-linear peak, the response of the measuring element will be automatically adjusted to insure a recorded linear peak within the confines of the record chart; for most cases.

The small change in the ionizing voltage occasioned by control relay 4 is sufficient to cause the recorder to re-scan the peak of the signal, but on a linear scale determined by the shunt selector. Relay 6 being energized, additional shunts are prevented from being added by opening of its contacts 6a. As the pen goes toward its peak position, on the linear scale, relay 7 is energized from ⊕—6a (now closed)—4b—DSc—

DSb—coil 7—LL— , and is held in by a circuit through contacts 6a and 7b.

After reaching the peak on linear operation, the pen again starts down-scale with contactor DS-16 centered (Operation F) and as the pen goes down-scale contacts 16 and D of DS close (Operation G) to drop out relays 3 and 4 and pick up relay 8.

Relay 8 is energized by a circuit from

⊖—LL—coil 8—7c—DSa—DSc—4b—6a—to ⊕

Contacts a of relay 8 now open to disconnect the holding circuit of relay 3 from ⊕ through 3a, and closes a holding circuit for itself through contacts 8c to ⊕.

The recorder pen returns rapidly to its zero position opening the lower limit switch LL dropping out all of the energized relays of the system, and the contact 16 of DS centers (Operation I), and the system is in condition for another recording operation.

The foregoing operations assume a quantity to be measured which will result in a normal record, both linear and non-linear, within the width of the record chart. In Fig. 3, for example, a normal record (a) comprises first a peak as measured on the non-linear or logarithmic scale as determined by the potentiometer P, followed by a rescanning of the peak on a linear scale as determined by the shunt selector segment X2. Curve (b) also is a typical normal record but the non-linear peak is higher because the non-linear response extends just within the range in which selector segment X10 is effective and the energization of relay 14 inserts shunt portion 34 into the measuring circuit resulting in a linear record lower than the non-linear peak. Curve d show the non-linear and linear peaks of substantially the same height as would occur when P on "non-linear" is on its 25°, or linear segment, and SS is on segment X1 energizing relay 11 for linear response.

Curve (c) however shows a condition in which the non-linear response is "off-scale," and the resulting linear response is corrected by the operation of relays 18 and 19.

When the recording pen passes its "off-scale" position, as in curve (c) Fig. 3, the upper limit switch UL closes completing a circuit from ⊕—UL—relay coils 18 and 19 in parallel—LL— ⊖

Energizing relay 18 closes contacts 18a thereby shunting a portion of the signal current through a resistor 40. Resistor 40 is adjustable to take care of unusual requirements, that is, conditions not normally expected to be encountered, but may be chosen to effect a 50:1 (or X50) response of the recorder to take care of most conditions. Relays 18 and 19 remain energized after UL opens in response to pen movement down-scale through ⊕—18b—coils 18 and 19 to ⊖.

Closing of 19a contacts establishes a circuit from ⊖ through 8b—2b—3b—coil 4 to ⊕ which accomplishes the ion voltage shift to cause the recorder to re-scan the peak on a linear scale as determined by relay 15 and its shunt 35, plus the shunt resistor 40.

The foregoing operations for off-scale conditions are indicated in Fig. 2. The upper limit UL closes at (a+) to energize relay 18 and 19 at b+, and thereafter during the same Operation period UL drops out at (a−). Relays 18 and 19 remain energized until they drop out in Operation I.

In accordance with the invention, an automatic recorder control is provided in which a graphic record is obtained of an electrical signal to be measured, giving the peak value of such signal as measured logarithmically to determine the value of the peak, and utilizing the recording of said peak value to so calibrate the recording system that it will then measure the value of such peak on a linear scale producing a record within the confines of the record chart.

Obviously, modifications may be made in the specific apparatus and circuits disclosed, but such specific embodiment has resulted in a recorder control which is rapid and accurate and makes possible a record which may readily be analyzed to obtain valuable data respecting the magnitudes of electrical signals being analyzed.

We claim as our invention:

1. In a recording system for determining the peak value of an electrical signal, the combination with a recorder of the balancing potentiometer type including a pen movable across a record chart from an initial position, and electrical measuring means for controlling the movement of said pen to record said peak value and to control the return of the pen to said initial position thereafter; of a control system for said recorder including means for automatically varying the response of said measuring means to make it non-linear as the pen traverses the chart toward the peak value of the signal being measured, means sensitive to the reversal of pen movement after such peak is recorded for causing said pen to again reverse its movement and record said peak value in accordance with a linear response of the measuring means comprising means for establishing a circuit for the signal direct to the measuring element, a series of shunts for inclusion in said circuit and means for selectively rendering them effective to vary the signal current to obtain a selected linear response of the measuring means including a selector switch automatically operated in synchronism with pen movement as the pen traverses the chart on its non-linear response to select a shunt corresponding to the extent of such movement for inclusion in the measuring means circuit.

2. In a recording system for determining the peak value of an electrical signal, the combination with a recorder of the balancing potentiometer type including a pen movable across a record chart from an initial position, and electrical measuring means for controlling the movement of said pen to record said peak value and to control the return of the pen to said initial position thereafter; of a control system for said recorder including a potentiometer in circuit with said measuring means for automatically varying the response of said measuring means to make it non-linear as the pen traverses the chart toward the peak value of the signal being measured, means sensitive to the reversal of pen movement after such peak is recorded for causing said pen to again reverse its movement and record said peak value with a linear response of the measuring means comprising means for disconnecting said potentiometer from the measuring means circuit and establishing a second circuit for the signal to the measuring means, a series of shunts for selective inclusion in said second circuit and means for selectively rendering them effective to vary the signal current to obtain a selected linear response, said last named means including a selector switch automatically operated in synchronism with pen movement as the pen traverses the chart on its non-linear response to select a shunt corresponding to the extent of such movement, and means responsive to the completion of the peak measurement on linear response for placing the recording system in its original non-measuring condition.

3. In a control system for measuring the peak value of an electrical quantity, an electrical measuring means, means operating in response to said quantity to operate said measuring means to measure the peak value thereof including a potentiometer controlled by said measuring means and in circuit therewith for interposing a gradually increasing resistance to the signal current to cause a non-linear response of the measuring means, and means including a selector switch controlled by said measuring means and operable in accordance with the peak value of said quantity as measured on non-linear response to establish a circuit to the measuring means independent of said potentiometer to obtain a linear response of the measuring means within the normal range thereof.

4. In a control system for measuring the peak value of an electrical signal, an electrical measuring means, means operating in response to said signal for actuating said measuring means for measuring the peak value of said signal including a circuit having means actuated by said measuring means for interposing a gradually increasing resistance to the signal current to cause a non-linear response of the measuring means, and means including a selector switch operable in accordance with the peak value of said signal as measured on said non-linear response to establish a second circuit to the measuring element independent of said resistance increasing means to obtain a linear response of the measuring element calibrated to be within the normal range of operation thereof.

5. In a control system for measuring the peak value of an electrical signal, an electrical measuring means, means operating in response to said signal for actuating said measuring means to measure the peak value thereof including a first circuit having means controlled by said measuring means such that said measuring means will measure the peak value of said signal with a non-linear response, a second circuit for measuring said peak value with a linear response of said measuring means including means calibrating it to maintain the response of the measuring element within a desired limit, said calibrating means being controlled by the extent of the response of the measuring means in measuring the peak value of the signal on the non-linear response thereof.

6. In a control system for measuring the peak value of an electrical signal, an electrical measuring means, means operating in response to said signal for actuating said measuring means to measure the peak value thereof including a first circuit having means controlled by said measuring means such that said measuring element will measure the peak value of said signal with a non-linear response, a second circuit for measuring said peak value with a linear response of said measuring means including a plurality of shunts for said measuring means and means for selectively including them in said second circuit to maintain the response of said measuring element within a desired range, said shunt selecting means being controlled by the magnitude of the peak value of the signal as measured on the non-linear response of said measuring means.

7. In a recording system including a pen co-operating with a record chart and a measuring means for controlling the movement of said pen, a control circuit including means for obtaining a non-linear response of the measuring means with respect to a signal to be measured to trace a record of the peak value of such signal, and means to reverse the movement of said pen after tracing said peak, means responsive to the magnitude of said non-linear peak for selectively calibrating a second control circuit for said measuring means to obtain a linear response thereof to said signal which will result in a pen record within the confines of the record chart, and means responsive to said reversal of pen movement for shifting the response of the measuring element from said first control circuit to said second control circuit to retrace the peak of the signal on a linear scale in accordance with the calibration of said second control circuit.

8. In a recording system including a recorder and a measuring means for controlling the operation thereof, a control circuit including means for obtaining a non-linear response of the measuring means with respect to a signal to be measured to record the peak value of such signal, a second control circuit for said measuring means including a plurality of calibrating shunts for selectively obtaining a desired linear response of said measuring means such that the response thereof is within the operating range of the recorder comprising a selector controlled by the peak value of the signal on non-linear response for selecting certain of said shunts for inclusion into said second circuit, and means responsive to the completion of the recording of said non-linear peak value for rendering said second control circuit effective to record the peak value on a linear response of said measuring means as determined by the shunt value so selected.

9. Apparatus for producing a response to an electrical quantity which may vary over a wide range comprising input means on which said quantity is to be impressed; output means responsive to said quantity; a first circuit including said input and output means for producing a first signal, said circuit including means interposed between said input means and said output means and actuable in dependence upon the initial response of said output means to reduce said initial response of said output means so that said first signal is proportional to a function of said quantity which increases at a substantially lower rate than in direct proportion to said quantity; and a second circuit including said input and output means for producing a second signal directly proportional to said quantity, said second circuit including attenuating means co-operative with said input means and actuable in dependence upon the initial response of said output means for setting the effective input produced by said quantity at a proper magnitude within the range of said output means.

JOHN A. HIPPLE, Jr.
DONALD J. GROVE.

REFERENCES CITED

The following references are of record in the file of this patent:

UNITED STATES PATENTS

| Number | Name | Date |
| --- | --- | --- |
| 2,269,227 | Rowell | Jan. 6, 1942 |
| 2,400,190 | Clark | May 14, 1946 |
| 2,476,005 | Thomas | July 12, 1949 |